United States Patent Office 3,519,441
Patented July 7, 1970

---

3,519,441
PROCESS FOR TREATING FLOUR AND STARCH TO ELIMINATE FREE SH GROUPS
Peter J. Ferrara, 47 E. 87th St., New York, N.Y. 10028, and James A. Snodgrass, Edinburgh, Scotland; said Snodgrass assignor to said Ferrara
No Drawing. Filed Aug. 5, 1966, Ser. No. 570,402
Int. Cl. A21d 6/00
U.S. Cl. 99—216                                 6 Claims

---

ABSTRACT OF THE DISCLOSURE

Preparation of a storage stable flour and/or starch which does not undergo rancidification by heating flour and/or starch to a temperature within the range of 220–305° F., maintaining the flour and/or starch at a temperature within this range, in contact with an atmosphere containing same in an amount of about 92 to 98 mole percent, under a pressure of 5–40 p.s.i.g., for a period of at least ten minutes, this time being sufficient to chemically modify the flour and/or starch so that no free SH groups are present therein and cooling the flour and/or starch.

---

This invention relates to stable cereal and oilseed products and more particularly to a method of processing cereal, grain, and oilseed to obtain products having a pleasing flavor, high nutritive value, and which are outstandingly stable.

Throughout the world, cereal products and products of oilseeds are consumed in large quantities in both human diets as well as animal feeds. The patterns of utilization are enormously varied in keeping with the local traditions which in many instances have survived for centuries. At the present time, in addition to such well known cereal staples as, for instance, rice, wheat, barley, oats, and corn, there have been added hybrid varieties of food supplies such as sorghum grains, plus products derived from oilseeds as exemplified by soya flour, cotton seed and peanut meals, and similar feed and foodstuffs, which are capable of being used either singly or in combination with cereal derived products.

The great variety of potentially useful cereals has given rise to a wide pattern of processing styles. Most products contain components which while differing from specie to specie, in terms of amounts and nutritional efficiency can be considered as sharing a fair degree of mutuality. Thus, most products can be considered as having an outer-coat, or bran layer, and within the seed coverings, various amounts of starch, sugars, fats or oils, proteins, minerals and other components.

In order to prepare these cereal products for use as feeds and foods, most products are subjected to different treatment procedures involving cleaning, grinding or milling, and diverse forms of separation and classification. In order that a condition of essential sterility or cleanliness be achieved with certain of the cereals just described before the further processing sequence is applied, the products are washed and sometimes heated. To improve digestibility of certain products for human diets, the seed coverings, usually cellulosic in nature, are removed during the milling process. In addition, certain cereal products contain more or less enzymes or enzymatic systems, some of which are useful per se and are isolated in accordance with the conventional techniques and sold separately; and, in those cases where the enzyme systems are considered to be harmful as for example in connection with certain diets, isolated or destroyed or otherwise disposed of.

In recognizing the most useful food or feed applications for the cereal fractions, processors have been responsible for many devices as well as processes, some practiced according to what are believed to be modern techniques, and many which are simply more efficient ways of carrying out the ancient arts of the past. Thus, for example, several approaches have been made to solve the problem of micro-organism contamination of flours and starches used for thickening soups and puddings, as batters for pancakes, cake and waffle batters, in baby foods, in doughs for piecrusts, rolls, biscuits, etc. There are in current use a number of known processes which can render cereal products micro-organism free, or at least reasonably so. These include ultraviolet radiation, heating, selected chemical inhibitors and stabilizers. Of these known methods for sterilizing flours and starches, i.e., heat, radiation, filtration or chemicals only heat has proved successful in a commercial scale.

In addition to the problem of eliminating microorganisms, there are instances where the processing of cereals results in fractions having poor digestibility or even a few bearing noxious enzyme systems interfering with the metabolic processes of humans and animals. In order to eliminate these undesirable enzyme systems from the flour and/or starch, various techniques have been proposed including pre-cooking, or the elimination of the undesirable enzymes, by special techniques.

One of the most difficult problems that processors of starches and flours have always faced is that the product obtained following cleaning treatment, sterilization and removal of undesirable enzymes, is quite perishable and in a short time becomes rancid and develops off-odors which affect its taste. This type of product may not accordingly be considered as possessing extensive shelf life or storageability. This lack of stability or perishability factor is well-known. To overcome the shortcomings of limited storageability, many proposals have been made directed toward solving the problem. These have included the use of anti-oxidants, attempts to modify the products' physical forms as by agglomeration, pelletizing, densification, use of digestible coatings, etc.; and attempts to exclude oxygen by evacuating the containers used for storing the goods (vacuum packing the product), or by substituting nitrogen or other inert gases for the air. None of the aforesaid methods has proved completely reliable or satisfactory.

It is a prime object of the instant invention to develop a process of treating flour and starch which provides a product of high nutritive content, which is micro-organism-free, free of unnecessary or undesirable enzymes, and which lasts much longer than the product which is presently prepared for commercial consumption.

A further object of the invention is to provide a process of treating flour and starch which results in an improved product capable of being kept, i.e., stored for a considerable period of time which process is efficient and reliable, can be carried out with relatively large amounts of product in a relatively short time, is relatively simple and employs inexpensive equipment.

A still further effect of this invention is a series of simple tests requiring only several minutes to carry out and only a few grams of the cereal product or its fraction, whereby the processing conditions required to achieve a fully stable and usable product ascertained.

The above and other objects will become apparent from a consideration of the following disclosure:

The present invention is based upon the discovery that a limited and critical area of processing conditions exists wherein flour and starch can be processed to at least substantially eliminated therefrom all micro-organisms in viable form, all unnecessary and undesirable enzymes and to render the same substantially non-perishable without adversely affecting its nutritive value.

In accordance with the invention, the flour or starch is heated to a temperature within the range of about 220 to 305° F. in an atmosphere containing steam or water vapor and maintained under a pressure of about 5 to 40 p.s.i.g., retained in said atmosphere at such temperature and pressure for a time of about 10 to 25 minutes, and then cooling the flour or starch.

It has been found unexpectedly that water vapor within this temperature range and under this pressure for the period of time indicated has a selective or directed effect not only upon the micro-organisms and enzymes present but also on any free sulfhydryl present resulting in the essential destruction and elimination of all three.

In accordance with the invention it has been found that while the destruction of micro-organisms and inactivation of the enzymes have been provided for and dealt with heretofore, in order to make a fully stable product from the standpoint of storageability, one must pay particular attention to the presence or absence of sulfhydryl or free SH radicals, in addition to the presence or absence of micro-organisms and enzymes. SH radicals are measurable qualitatively by a technique involving a solution of sodium nitroprusside. It has now for the first time been found that only when the free sulfhydryl has been completely eliminated is the steam treated flour and/or starch satisfactory for prolonged storage and that this can be accomplished by steaming cereal fractions at intermediate pressure levels, in the range of 5 to 40 p.s.i.g., for a time interval extended by 20 to 30% over that required for the elimination or destruction of the enzyme system. The result is the removal or disappearance of free SH, and it is this condition which assures the complete avoidance of rancidification during prolonged storage.

With this knowledge of the role of SH in storageability of cereal fractions, provided steam treatment could be applied, it makes it unnecessary to be concerned with testing techniques other than those needed to assure the destruction of enzymes and the elimination of SH (Microorganisms are substantially eliminated prior to the destruction of the enzymes). While this conclusion is amply borne out in the tabulations set out in the examples which follow, the theoretical explanation or basis for this phenomenon may provide a fuller understanding of the invention.

It is accepted knowledge that most cereal products and fractions thereof contain varying amounts of sulfhydryl or SH radicals, these being generally associated with the protein fractions. It has now been found that the presence of free SH radicals contributes to poor storageability of cereal products, with even poorer results when the free SH is associated with fractions of cereals and oil seeds having higher than the usual levels of oils and fats. It is theorized that the process of steam treatment quickly disposes of the free SH appearing in the form of cysteine, this being converted into the more stable disulfide form, cystine. The free SH appearing in the form of glutathione while it is generally considered quite labile in that it has a low redox potential and forms the glutathione di-sulfide commonly referred to as G-S-S-G, is not as easily eliminated as a source of SH. This is believed to be due to the fact that the resulting disulfide form, G-S-S-G, is easily transformed back to the reduced form. Thus, there appears to be a constant cycling of the glutathione tripeptide G-S-H until the large molecule is actually parted to free the cysteine unit. Then, as the free cysteine appears, from the glutathione source, it is gradually withdrawn under the influence of the steaming process, by virtue of its eventual conversion to the heat stable cystine form.

These theoretical concepts seem borne out by certain experiments. Thus, when cysteine, cystine, glutathione (G-S-H), and glutathione di-sulfide (G-S-S-G) were separately added to flour samples which were already processed for enzyme destruction and SH elimination, in each case 0.15% by weight being added, and the stabilized flours steamed for a 3-minute interval at 15 p.s.i.g., cooled and stored, the only sample which retained the excellent storage properties equal to the control was that with added cystine. The others acted just as if the steaming interval was inadequate, and showed a change in flavor in 8 weeks.

When all four potential sources of "SH radicals" were added to a previously well steamed flour, and which was not subjected to further steaming, only the two samples of flour containing the actual reduced forms of SH, the cysteine and the glutathione (GSH) showed the normal tendency toward loss in storageability, with a very slight to nil effect from the G-S-S-G, and zero effect from the cystine.

The destruction or alteration of the SH from the G-S-H or G-S-S-G is easily confirmed by the inclusion in the steam atmosphere, strips of filter paper previously immersed in a solution of lead acetate, a sensitive test for SH or $H_2S$. Thus, steaming does cause the break-down in SH from G-S-H and G-S-S-G.

Having set forth the theory of the physico-chemical changes through the application of moderate steam pressure as a device to eliminate active, free sulfhydryl radicals to produce stable cereal and oilseed products possessing prolonged storageability; and recognizing that the destruction of micro-organisms and the elimination of enzyme systems are accomplished before the SH elimination is achieved, one may therefore understand that the invention in practice has for its primary concern the determination that the final products are free of active SH either as cysteine or glutathione.

As employed herein, the terms "flour" and "starch" include but are not limited to flours and/or starches derived from wheat, corn, and other cereal grains such as rye, barley, as well as from certain legumes, such as soy beans, peanuts, and the like.

In order that a condition of essential sterility, the absence of enzymes and SH groups be achieved with the class of materials just described within a period of time providing reduced opportunity for heat damage to the flour and/or starch to occur, it has been found that the temperature to which the flour and/or starch has to be heated should fall generally within the range of about 220–305° F. at levels significantly below the lower end of this range, the chance of an undesirable amount of micro-organisms, in particular spores, remaining in a viable state is increased, as is the failure to eliminate enzymes and the SH groups. Similarly, the likelihood of heat damage increases as the upper end of the range is materially exceeded. Preferably, the treatment temperature is from about 235–275° F., and 250–270° F. has been found to be optimum.

Preferably, the flour and/or starch undergoing treatment should be brought to operative temperature as rapidly as possible. It will be appreciated that, while some latitude is possible, the preferred practice is to bring the flour to the desired temperature as quickly as possible, for instance in less than about one minute and preferably even about three to five minutes. In general, while uniformity in the rate of temperature elevation within the entire mass of flour and/or starch being exposed to heat is desirable, the treatment will be satisfactory as long as all of the flour and/or starch being exposed to the heat reaches the minimum effective temperature before the most remote localized portion thereof begins to char. What is being sought in this regard is the smallest possible temperature differential from portion to portion of the flour and/or starch being treated.

The minimum time of exposure is, of course, dependent on the other condtions, i.e., pressure, starting material, etc., but it has been established that a minimum time of at least ten minutes to a temperature within the stated range is necessary to destroy the normal incidence of micro-organism, including spores, enzymes, and to convert all of the SH present to an inactive form. The exposure time may have to be extended up to about 25 minutes, the time chosen being dependent in a large measure on the temperature, end use, starting material, etc.

The presence of steam, i.e., water vapor in the atmosphere in which the flour and/or starch is maintained, is an essential requirement to the attainment of the basic objectives as herein outlined. The amount of steam may vary as low as about 50 mol percent and as high as about 99 mol percent, with about 92 to 98 mol percent being a more usual range.

The provision of steam means that the treatment be carried out under super-atmospheric pressure. The extent of pressure may be varied considerably; a pressure range found satisfactory is from 5 to 40 p.s.i.g., 10 to 25 p.s.i.g. being preferred.

The invention is capable of being carried out in a number of different ways, using any of the conventional apparatus available therefor. In fact, the only important restriction upon the choice of system or apparatus apart from those which are obviously necessary to the attainment of the process variables is that the flour must be maintained in a state or form conductive to a substantially uniform rate of heat absorption or temperature increase. This limitation has been found to be satisfied by working with the fluor, for example in small batches, thin layers, as a constantly agitated mass, for instance as a fluidized bed or stream. Other modes of overcoming the poor heat transfer properties of flour and starches will occur to the experts.

A more detailed understanding of the invention will be further facilitated by the following illustrative examples:

EXAMPLE 1

This example is concerned with the processing of an ordinary grade of all winter wheat flour with steam heat to destroy all contaminating micro-organisms, inactivate the wheat gluten or protein as well as the flour enzymes, and to conduct the steam processing to the degree necessary for producing a flour product which may then be stored without added preservatives for periods of a year or more, without deterioration in flavor or useful characteristics.

The wheat flour sample used showed assays which are fairly typical of a well milled flour: protein—11.8%, ash—0.49%; moisture—12.6%.

3 lots of this flour of 160 grams were weighed out, and each was placed in an 8-inch diameter pie tin having straight sides 1-inch high. The flour was smoothed to a uniform layer approximately ½ inch in depth. The 3-pie tins were installed one above the other in a pressure cooker to which a tight lid could be attached. The pressure cooker was preheated, the tins installed. Each pie tin was covered with a protective foil to prevent any condensate from the lid or the bottom of the tin above it from falling onto the surfaces of the flour. Enough hot water was placed in the pressure cooker to cover the bottom to a depth of ½", just enough to allow for the generation of steam pressure, plus the adsorption of moist vapors into the flour samples. The heating-up of the cooker was rapid, the air was purged and a pressure indicating cap applied to the lid. A pressure of 15 pounds per square inch, equivalent to 250° F. was obtained within 3 minutes. The 15 pounds pressure was maintained for varying intervals and then released. The steam-heated flours were immediately withdrawn, and cooled by spreading the flours on a sheet of foil. When cooled, this occurring within 3–4 minutes, the moisture content of the flours fell to a level of 10–12%, approximating the initial moistures.

Samples of flours produced at pressure cooking intervals of 2 minutes and from 2 minutes to a maximum of 20 minutes were collected and subjected to analysis. Thereafter, the samples were stored in covered glass jars at 100° F., in a humidity cabinet where a relative humidity cabinet where a relative humidity of 75% was maintained. Each day the covers of the jars were removed for a 1-hour interval, and replaced. At the end of one month of storage, and monthly thereafter, the flour samples were subjected to organoleptic tests.

Each flour sample which was steam treated was checked for viscosity characteristics, using a slurry of 60 grams of treated flour in 450 ml. of water, with an Amylograph of the C. W. Brabender Company. The cartridge was 700 g.c.m., and the flour water slurry heated at a rate of temperature rise of 1.5° C. per minute from 25° C. up to 92.5° C. Higher viscosity peaks, as well as less of a drop from the viscosity peak, were taken as indicative of lower incidence of residual flour enzymes which were recognized as reducing the water-holding capacity of the starch.

In addition to the viscosity comparisons, the flours were tested for micro-organism count. The method used was that used by cereal chemists to determine the incidence of "rope" in flours and cereal products. (G. Dalby, C. Hoffman and T. R. Schweitzer, Industrial Engineering Chemistry, vol. 29, 464 (1937), Control of Rope in Bread.) A suspension of 10 grams of flour in 100 ml. of distilled, sterilized water was prepared in a flask. Aliquot portions of this suspension were added to test tubes containing 10 ml. of a sterilized culture media. The culture tubes were inoculated in pairs and kept at a temperature of 98° F. for 96 hours. The formation of a surface pellicle, a bad odor, or noticeable turbidity were taken as indications of micro-organism contamination. The target sought was a micro-organism count less than 1 per gram. This means no indications of active micro organisms until a minimum of 10 ml. of flour suspension are incubated with the media.

Another means of examination was the use of 1% solution of guaiacol and 10% hydrogen peroxide. In performing this test, the conventional procedure well known to the artisan in this field is employed (the reaction of guaiacol when oxidized by peroxidases is reviewed in Booth and B. C. Saunders (J. Chem. Soc. (1956) 940)), which is a sensitive means of determining the presence of peroxidases, generally considered the most thermal stable enzyme system in cereal products; one takes 10 grams of flour and places this on a glass surface, and smooths it with a spatula to form a small pile. 3 ml. of 1% guaiacol is slowly dropped onto the flour to achieve some wetting of the surfaces of the flour. Then, 3 ml. of the hydrogen peroxide is applied to the flour areas wet with the guaiacol. Any coloration from light pink to red or brown indicates the presence of an active enzyme system, with darker discolorations showing elevated levels of enzyme activity. The presence or absence of SH, the latter being critical for providing a storage stable product was then determined (supra).

The results of the analyses are set out in Table I which follows.

TABLE I.—RED WINTER WHEAT FLOUR
[11.8% protein; 0.49% ash; 12.6% H₂O]

| Duration of steam treatment at 15 p.s.i.g. (min.) | Micro-organism test—count of 1 per gram | Test for enzyme activity | Test for SH | Viscosity Brabender, Peak | Readings[1] units decrease from peak |
|---|---|---|---|---|---|
| 0 | Positive+ | Positive+ | + | 580 | 180 |
| 2 | Positive+ | Positive+ | + | 640 | 140 |
| 4 | Positive+ | Positive+ | + | 690 | 110 |
| 6 | Nil− | Faint± | + | 800 | 110 |
| 8 | − | Nil− | + | 940 | 70 |
| 10 | − | Nil− | + | 1,100 | 55 |
| 12 | − | Nil− | Nil | 1,220 | 40 |
| 14 | − | − | − | 1,210 | 20 |
| 16 | − | − | − | 1,250 | 20 |
| 18 | − | − | − | 1,240 | Nil |
| 20 | − | − | − | 1,240 | 10 |

[1] C. W. Brabender Co., South Hackensack, New Jersey.

EXAMPLE II

A sample of a spring wheat flour, high protein, was treated in the same manner as the winter wheat flour. The results shown in Table II indicate spring wheat flours have less enzyme activity, and respond more readily to the steaming at a pressure of 15 p.s.i.g. The flour composition was protein 13.0%, ash 0.44%, moisture 11.9%.

TABLE II.—SPRING WHEAT FLOUR

| Duration of steam treatment at 15 p.s.i.g. (min.) | Micro-organism test count of 1 per gram | Test for enzyme activity | Test for SH | Viscosity Brabender, peak | Readings units decrease from peak | 6-month product stability |
|---|---|---|---|---|---|---|
| 0 | Positive+ | Positive+ | Positive+ | 660 | 120 | No. |
| 2 | Positive+ | Positive+ | Positive+ | 680 | 110 | No. |
| 4 | Positive+ | Positive+ | Positive+ | 780 | 95 | No. |
| 6 | Nil | Faint | Positive+ | 890 | 55 | No. |
| 8 | − | Nil | Positive+ | 960 | 30 | No. |
| 10 | − | − | Nil | 990 | 20 | Yes. |
| 12 | − | − | − | 1,010 | 10 | Yes. |
| 14 | − | − | − | 1,000 | 10 | Yes. |
| 16 | − | − | − | 990 | Nil | Yes. |
| 18 | − | − | − | 1,010 | 10 | Yes. |
| 20 | − | − | − | 1,010 | Nil | Yes. |

Samples of the wheat flours, Examples I and II were subjected to different pressure levels in the range of 5–40 p.s.i.g. It was found that at pressures in the vicinity of 5 p.s.i.g. required up to twice the time interval of the 15 p.s.i.g. treatment, to produce the same degree of SH elimination. These more extended time intervals had a negligible effect on color and organoleptic properties, i.e., taste and odor, though these were accompanied by a loss of 5–10% in viscosity peaks.

Increasing the steam pressure beyond 15 p.s.i.g. up to 40 p.s.i.g. accelerates the inactivation of the enzyme system, but appears to have only a slight tendency to speed up the rate of SH removal. Beginning with pressures in the range of 25 p.s.i.g. and above this, wheat flours tend to discolor, first as a pleasing creamy tan, then showing a browning tendency. The best flavored wheat flours, stabilized for prolonged storage appear to be the result of treatment in the range of 10–25 p.s.i.g. This range of pressure, with a time interval of 10–14 minutes, produces excellent flour products completely stable, and devoid of chemical-like flavors or odors.

EXAMPLE III

An interesting example of the significance of eliminating the active enzyme system as well as the free SH (measured qualitatively by the nitroprusside test) is with a commercial wheat germ meal having guaranteed analysis; crude protein, not less than 25.0%; crude fat, not less than 7.0%; crude fiber, not more than 4.0%, and nitrogen free extract, not less than 40.0%.

Those familiar with wheat germ meal will appreciate how unstable the product is, and the requirement that it be stored under refrigerated conditions for any reasonable shelf-life during warm weather. Even then, the wheat germ begins to develop oxidative rancidity measured by an increase in "free-fatty-acids" (F.F.A. value of the oil as oleic acid) almost from the first several days after it is removed from the flour stream.

Wheat germ meal samples were processed in the same manner as the wheat flour Examples I and II. When the wheat germ meal was steamed for periods between 10–15 minutes, at steam pressures from 15 to 30 p.s.i.g., the wheat germ meal was converted into a completely stable product, free of enzyme activity and SH, and could then be stored without refrigeration for periods of 6 months, or more, without vacuum, nitrogen or special techniques. Table III lists the analysis of F.F.A. (free fatty acid) expressed as percent oleic acid in the oil, of a commercial wheat germ meal processed with steam according to the invention technique, 2 weeks after it has been produced at a flour mill.

TABLE III.—COMMERCIAL WHEAT GERM MEAL
[8.9% oil; 10.5% H₂O]

| Weeks from date of production | Control—raw commercial germ meal | | Steam process germ, 22 p.s.i.g.—14 min. | |
|---|---|---|---|---|
| | Percent FFA in oil | Flavor[1] | Percent FFA in oil | Flavor[1] |
| Start: | | | | |
| 2 | 4.3 | Good | 4.3 | Excellent. |
| 4 | 5.2 | ___do___ | 4.0 | Do. |
| 6 | 12.4 | Fair | 4.1 | Do. |
| 7 | 18.1 | Poor | 4.5 | Do. |
| 8 | 20.5 | | 4.4 | Do. |
| 9 | 21.8 | | 4.7 | Do. |
| 10 | 22.1 | | 4.5 | Do. |
| 11 | 22.3 | | 4.4 | Do. |
| 12 | 22.6 | | 4.5 | Do. |
| 14 | 23.0 | | 4.4 | Do. |
| 26 | 22.9 | | 4.4 | Do. |

[1] Flavor of samples stored at room temperature 75° F.±5° F.

Wheat germ with its normal content of oil is useful in nutrition and for its Vitamin E and protein content. Additionally, the incidence of bran in germ meal offers bulking or laxative value, making wheat germ an excellent geriatric food supplement. However, its main deterrent to a more widespread utility is the lack of product stability such as disclosed in Table III.

When wheat germ was steamed at pressures up to 5 p.s.i.g., the steaming time interval required to inactivate the SH and achieve complete product storage ability was raised to a level of 35–50 minutes. This longer time interval is enough to char some of the heat sensitive bran, and cause a bitter coffee-like flavor to develop. Thus, when the steam processed germ meal, free of SH radicals, is used in a baking process as a flour adjunct or supplementary flavor source, the appealing germy flavor is greatly diminished. There appears to be a slight but noticeable difference in SH and enzyme activity just as in the case of spring versus winter wheat flours, between wheat germ meals made from different wheats, but these differences are easily compensated for by a slight adjustment in the steaming conditions and a fully satisfactory product is obtained just so long as the SH is eliminated.

EXAMPLE IV

Soybeans intended for human consumption were cleaned, dehulled, and then milled to the desired granulation. An important step in the sequence of soybean milling is the heating of the soybean to eliminate its beany flavor, and to destroy the enzyme known as urease. This enzyme has a strong anti-trypsin action thus interfering with the normal digestive processes. The heating to obtain these improved properties in the soybean products is frequently referred to as debittering.

A good commercial grade of soybean flour will assay 42% protein and 22% soybean oil. The oil fraction contains the phosphatides which include natural appearing anti-oxidants. Thus, soybean flours, debittered to a level of urease activity equivalent to 0.20 Sumner units are generally classed as stable and suitable for inclusion in food products.

It has been found that commercial grades of debittered soybean flours, subjected to the nitroprusside test, display a strong pink coloration, indicative of free SH. There is a definite change in the flavor of the soybean flours after 8–10 week storage. This off-flavor is sometimes unnoticed because the debittered soybean flours still have a slight beany odor. The nitroprusside test while reasonably pink, in the case of the commercial grades of debittered soybean flours, responds to a free sulfhydryl level of 5 to 6 micromoles of SH per gram of product, measured by the Kolthoff method using a rotating platinum electrode.

The same soybean flours may be steamed with 10–15 p.s.i.g. of steam, for only 10–12 minutes, and the nitroprusside indication of SH is reduced to nil. The urease activity of the soybean flour is reduced to less than 0.05 Sumner units, and the amperometric titration value of free SH is reduced to a level of 2.4 micromoles of SH per gram. The resulting soybean flour not only has unique shelf-life, samples kept for 12 months were unchanged, but the beany flavor is completely eliminated. The soybean flour has an appealing flavor resembling slightly the mild nutty flavor of lightly toasted peanuts. This is another example of how this invention may improve the storageability and usefulness of nutritionally important oilseed products such as soybean flours and meals.

Having thus described how the invention is utilized to make practical and useful cereal and oilseed products, possessing unique factors of quality, flavor and stability, and how one is able to establish by means of the simple and rapid nitroprusside test, that the proper extent of the processing suggested by the invention herein has been applied with full effectiveness, and without limiting the products or the process methods to the examples cited herein, what is claimed is:

1. Method of treating at least one member selected from the group consisting of flour and flour starch for eliminating all of the free SH groups therefrom which comprises the steps of heating said product to a temperature within the range of 220–305° F., maintaining said product at a temperature within said range in contact with an atmosphere containing steam in an amount of about 92 to 98 mole percent under a pressure of 5–40 p.s.i.g. for a period of at least ten minutes, said time being sufficient to chemically modify said product so that no free SH groups are present therein and cooling said product whereby said product is substantially completely storage stable and does not undergo any rancidification.

2. Method according to claim 1, wherein said flour is brought to said temperature as rapidly as possible.

3. Method according to claim 1, wherein said pressure amounts to from 10 to 25 p.s.i.g.

4. Method according to claim 1, wherein said product is maintained at said temperature and pressure for a period of from 12 to 20 minutes.

5. Method according to claim 1, wherein said flour is derived from at least one member selected from the group consisting of wheat, corn, rye, oats, barley, soybeans, and peanuts.

6. Process according to claim 1, wherein said starch is derived from at least one member selected from the group consisting of wheat, corn, rye, oats, barley, soybeans, and peanuts.

References Cited

UNITED STATES PATENTS

| | | | |
|---|---|---|---|
| 3,133,818 | 5/1964 | Gould et al. | 99—80 |
| 3,133,836 | 5/1964 | Winfrey et al. | 127—71 |
| 3,159,493 | 12/1964 | Japikse et al. | 99—232 XR |
| 3,159,494 | 12/1964 | Lawrence et al. | 99—232 XR |
| 3,368,904 | 2/1968 | Young et al. | 99—93 |
| 3,396,033 | 8/1968 | Ferrara et al. | 99—80 |

RAYMOND N. JONES, Primary Examiner

U.S. Cl. X.R.

99—2, 93, 99

PO-1050
(5/69)

UNITED STATES PATENT OFFICE
CERTIFICATE OF CORRECTION

Patent No. 3,519,441      Dated July 7, 1970

Inventor(s) PETER J. FERRARA and JAMES A. SNODGRASS

It is certified that error appears in the above-identified patent and that said Letters Patent are hereby corrected as shown below:

Col. 3, line 15, "eliminated" should be --eliminate--; col. 5, line 11, "condtions" should be --conditions--; col. 5, line 39, "conductive" should be --conducive--; col. 6, line 7, "pounds" should be --pound--; col. 6, line 19, cancel "cabinet where a relative humidity"; column 10, line 11, cancel "flour" (2nd occurrence)

SIGNED AND
SEALED
OCT 18 1970

(SEAL)
Attest:

Edward M. Fletcher, Jr.
Attesting Officer

WILLIAM E. SCHUYLER, JR.
Commissioner of Patents